United States Patent Office 2,802,026
Patented Aug. 6, 1957

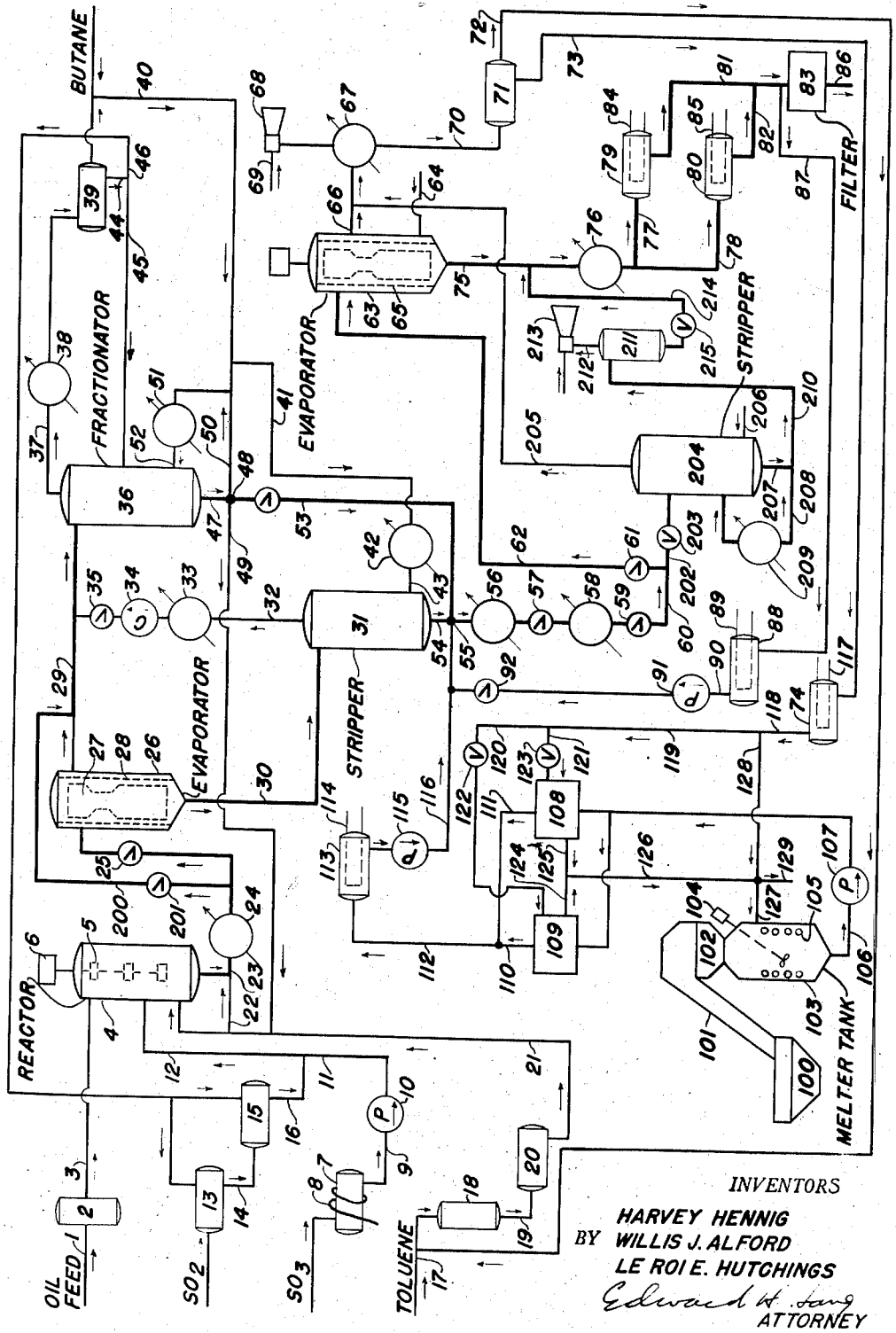

2,802,026

MANUFACTURE OF SULFONATES

Harvey Hennig, Willis J. Alford, and Le Roi E. Hutchings, Crystal Lake, Ill., assignors to The Pure Oil Company, Chicago, Ill., a corporation of Ohio Application December 29, 1954, Serial No. 478,450

18 Claims. (Cl. 260—504)

This invention relates to a method of preparing sulfonates from hydrocarbon oils and more particularly to an integrated process for the production of petroleum sulfonates on a continuous scale.

It is known in the art to prepare oil-soluble mixtures of metal salts of both mahogany sulfonic acids and green sulfonic acids in lubricating oils by contacting a mineral lubricating oil with concentrated sulfuric acid followed by neutralizing the product with a metallic base, usually in the presence of a large excess of water. Temperatures between about 100° to 150° F. are used and the resulting mixture of sulfonates is treated with a diluent, such as petroleum naphtha or benzene, and immediately neutralized with an alkaline compound. Where sulfur trioxide is used as the sulfonation agent, it is the practice to use a special technique for introducing the sulfur trioxide into the sulfonation reactor, i. e., by suspension in an inert carrying medium, such as a low boiling hydrocarbon. Other investigators have used sulfur trioxide mixed with sulfur dioxide, with or without air, in the gaseous phase as the sulfonation agent. In this operation the green acids separate out as a sludge in a first settling chamber and no sulfur dioxide stripping is employed. In still other prior processes, using oleum dissolved in sulfur dioxide, the sulfur dioxide is stripped by water dilution, which produces heat, or by pressure reduction generally in two stages. Other patents teach the use of a solvent only to increase the amount of mahogany acids recovered where oleum is the sulfonating agent, and, according to at least one patent, the use of sulfur dioxide is specifically avoided. In some instances the use of an unsulfonatable solvent like acetonitrile is suggested as a direct substitute for sulfur dioxide in the reaction. It is usually desirable to separate the excess sulfonating agent before neutralization. Such processes are described in United States Patents 2,381,708, 2,084,506, 2,448,370, 2,616,936, 2,514,733, 2,358,774 and 2,285,390.

The present invention is based on the discovery of a continuous method of petroleum sulfonate manufacture including the features of using sulfur dioxide and a mutual solvent in the reaction zone, incorporating a stripping step using a gaseous hydrocarbon as the stripping medium, and a particular neutralization reaction procedure wherein the water of reaction, etc., is used to wash the filter cake from the base purification unit. Another feature of the invention is the elimination of a water phase in the neutralization and product purification stages of the reaction. This is accomplished in several ways including subjecting all incoming organic materials i. e., the feed oil, solvent, and sulfonating agent, to substantial dehydration or drying, and further a still more important expedient comprises employing during the neutralization reaction only that amount of water which is necessary to activate the base or change the metal oxide neutralizing agent to a hydrated and more active form. Neutralization is accomplished by reacting molten, hydrated base, which is soluble in the oil phase, with the sulfonated products under controlled conditions of water evaporation. This assures the absence of an aqueous phase and avoids the disadvantages inherent in some processes of separating troublesome emulsions in order to obtain the final products. Also, the present procedure eliminates the necessity of controlling the pH during neutralization, a procedure which often increases the process time and is not always successful in attaining satisfactory product purity.

A method of maintaining uniform reaction temperature will also be described. The invention comprises, therefore, a combination of process steps and their relation to each other, as hereinafter more fully explained.

In general, the preparation of petroleum sulfonic acids and their metal salts is carried out by admixing the oil feed with a mixture of sulfur trioxide dissolved in liquid sulfur dioxide in a reaction chamber. The sulfonating mixture and oil are then heated in a confined reaction zone to a temperature of at least about 14° F., and as high as 150° F., depending on the type of hydrocarbon material used. Superatmospheric pressures are maintained in the reactor to just maintain liquid phase conditions. This pressure is about atmospheric to 150 p. s. i. g., or about 5 to 30 p. s. i. g. above the pressure in the surge tank containing the sulfur dioxide. The amount of liquid sulfur trioxide used also depends somewhat on the characteristics of the oil feed being treated. In general, the amount of sulfur trioxide will be from 4 to 15 weight percent based on the amount of oil feed. The sulfur dioxide is introduced in an amount sufficient to maintain the reaction mixture in a liquid state, and preferably an amount is used to establish a distinct sulfur dioxide phase within the reaction products. This amount will vary somewhat depending on the characteristics of the sulfonated products, but in general the ratio of liquid sulfur dioxide to oil feed will be about 0.25 to 3.0 on a liquid volume basis.

The introduction of these materials takes place at the top of the reactor and the products are continuously withdrawn from the bottom of the reactor. The reaction products comprise an oil phase containing unreacted oil, oil-soluble sulfonic acids (the mahogany acids), some sulfur dioxide, and a small amount of suspended water-soluble sulfonic acids (the "green" acids), and a sulfur dioxide phase comprising some unreacted oil, water-soluble polar "green" acids, and some oil-soluble sulfonic acids. This reaction mass is sent to a sulfur dioxide evaporator and stripper wherein the sulfur dioxide is removed. During the separation of sulfur dioxide in the stripping chamber an insoluble sludge separates. This can be prevented by adding just prior to the stripping operation a mutual solvent selected from a group consisting of those thermally stable, inexpensive, low-boiling aromatic compounds which are miscible with both the hydrocarbon oil and sulfur dioxide phase, such as benzene, toluene, or xylene, or their homologues, and mixtures thereof.

To accomplish this result a sufficient amount of mutual solvent is added to the reaction mass. In general, about 0.2 to 2.0 volumes of mutual solvent per volume of oil feed may be used for this purpose. However, this amount may be varied somewhat depending on the amount of sludge that may form during the sulfur dioxide stripping operation. The use of an excess of mutual solvent over that required to prevent sludge formation is not detrimental. For the sulfonation of most hydrocarbon oils containing constituents which are readily susceptible to the sulfonation reaction, the use of 0.2 volume of mutual solvent per volume of oil feed will provide a sufficient amount to overcome sludging, and at the same time, since it is not appreciably lost during the sulfur dioxide stripping, supply a sufficient amount to aid in the control of the neutralization reaction.

Xylene, xylene fractions, and low-boiling aromatic fractions may be used during the stripping operation. A particularly effective solvent comprises xylene fractions having a boiling range of about 275° F. to 310° F. produced by hydroforming petroleum hydrocarbons. By mutual solvent is meant a solvent which is sulfur dioxide-soluble and oil-soluble. In addition, it has been found that with this procedure waxy materials which otherwise separate out of both phases at below 32° F. are also maintained in a fluid state and the viscosity of the oil phase is considerably reduced. The reaction conditions are such that no appreciable amount of most solvents will be sulfonated if the mutual solvent is introduced with the incoming feed. However, to avoid the possibility of sulfonating the mutual solvent, the best procedure is to introduce the mutual solvent at the bottom of the reactor near the point at which the products enter the line leading to the sulfur dioxide evaporator.

The reaction products are then heated to remove the major portion of the sulfur dioxide, followed by treatment or stripping in the presence of a low molecular weight hydrocarbon such as butane or pentane to release the balance of the sulfur dioxide. The heating step is conducted at a temperature of about 140 to 220° F. using superatmospheric pressures to control the evaporation of sulfur dioxide. The low molecular weight hydrocarbon is used to aid in the evaporation of the sulfur dioxide. To accomplish this purpose a sufficient amount of unsulfonatable low molecular weight hydrocarbon is used to create a partial pressure great enough so that the temperature of evaporation need not be above about 220° F. This amount will vary in accordance with the amount of sulfur dioxide present, and in general will be about 1/5 the amount of sulfur dioxide introduced. Thus if the ratio of sulfur dioxide to oil feed is 0.25 on a liquid volume basis, only about 0.05 volume of low molecular weight hydrocarbon per volume of feed oil need be used. Conversely if 3.0 volumes of sulfur dioxide are used, the volume ratio of low molecular weight hydrocarbon to feed will be about 0.5. The stripped products are then ready for filtration if the preparation of a mixture of relatively pure petroleum sulfonic acids is the objective. The conditions used in other steps of the process will be explained in connection with the drawing.

An important aspect of the invention is the preparation of metal salts of petroleum sulfonic acids in which process the stripped products are subjected to neutralization by reaction with a melt of the hydrated metal base during controlled evaporation of the water present taking place in a pressure-controlled heat exchanger. It has been found that substantially complete utilization of metal oxide or hydroxide can be obtained by controlled evaporation of the water so that the temperature is maintained at between about 300–400° F. using sufficient pressure to prevent the water from assuming a vapor state. The melt of metal base is soluble in the oil phase and neutralization is effected without the danger of emulsification since the water phase is negligible. The next step in the process is the steam stripping of the mutual solvent under which conditions it has been found that again no emulsification takes place and the small amount of water thereby introduced is easily assimilated.

One object of the invention is to provide a continuous method for the manufacture of petroleum sulfonates.

Another object of the invention is to increase the quantity and quality of metal sulfonates, or pure sulfonic acids, which can be recovered from sulfonation products made from hydrocarbon oils.

Still another object is to provide a method of reducing foaming and sludge formation during the preparation of petroleum sulfonates and maintaining uniform reaction temperatures.

Another object of the invention is to provide a process for the production of metal salts of petroleum sulfonates wherein the neutralization of the completed sulfonic acids is conducted using only sufficient water to activate the neutralization agent, and the pressure during neutralization is controlled by means of a valve.

Other objects and advantages of the invention will appear or be obvious from the following description.

The drawing is a diagrammatic representation of the flow for the instant process. The invention is best understood by reference to the drawing wherein oil to be sulfonated is introduced via line 1 into drier 2 where the oil is treated with alumina, an adsorbent clay, or rock salt, to remove any traces of water that may be present. From the driers the oil passes through line 3 into the top of reactor 4. Reactor 4 may be any suitable type of reactor, preferably constructed of carbon steel and equipped with efficient stirrers, as indicated by agitator 5 preferably constructed of stainless steel and operated by motor 6, to insure intimate contact of the reactants. Sulfur trioxide is stored in tank 7 and maintained in a liquid state by wet steam or hot water in external coil 8. For use in the reaction, sulfur trioxide is withdrawn through line 9 by a pump 10, and passes into lines 11 and 12 leading to reactor 4. Liquid sulfur dioxide is stored under pressure in tank 13 and is used as a solvent for the sulfur trioxide sulfonating agent in the present process. Contact and mixing of the sulfur dioxide and sulfur trioxide are made just prior to their entry into the reactor. A ratio of sulfur dioxide to oil feed of between 0.25 to 3.0 on a liquid volume basis has been found sufficient to maintain a liquid phase in the reactor. As before stated, the amount of sulfur trioxide required will depend on the feed oil employed and on the type of product desired, but generally will be about 4 to 15 weight percent of the oil feed. Sulphur dioxide is withdrawn via line 14 into surge tank 15, and thence by line 16 into line 12 where it mixes with the sulfur trioxide coming in to reactor 4. The pumps used may be proportioning pumps to regulate the composition of the sulfonating mixture.

As previously described, a mutual solvent, such as toluene, xylene, benzene, etc., is used in contact with the reactants to prevent foaming and sludge formation. For this purpose toluene, amounting to about 0.2 to 2.0 volumes per volume of oil feed, is conveyed via line 17 into drier 18, for removal of any moisture it may contain, on through line 19 into surge tank 20, and thence via line 21 to the bottom of reactor 4. It has been found advantageous to inject the toluene into the reactants and reaction products as they leave or are about to leave the reactor. For this latter purpose a portion or all of the toluene may be passed through line 22 into reaction product line 23.

Reaction products leave the reactor through line 23, pass through heater 24 and valve 25 to sulfur dioxide evaporator 26. Heater 24 is equipped to maintain the products at a temperature not over 200° F. Evaporator 26 is equipped with an agitator 27 and is jacketed (28) so that boiling water or steam may be used to indirectly heat the products to about 140° to 220° F. in order to quickly evaporate the sulfur dioxide along with a portion of the toluene passing out by means of line 29. The evaporator 26 may be of the "Turba-Film" or similar type wherein mechanical means are employed to minimize difficulties due to foaming. The major part of the sulfur dioxide in the reactor effluent is removed in evaporator 26, and is at a pressure sufficiently high to eliminate any need for pressure to recycle the sulfur dioxide. This pressure will be about atmospheric to 150 p. s. i. g. The remaining products are conveyed from evaporator 26 via line 30 to sulfur dioxide stripper 31 wherein countercurrent contact is made with an up-flowing stream of a normally gaseous hydrocarbon, such as propane, butane, or pentane entering by line 43 from a source yet to be described. The mixture of gaseous hydrocarbon and sulfur dioxide coming from the top of stripper 31 passes through line 32 and heat exchanger 33 into compressor 34 and control valve 35. This mixture joins the sulfur dioxide-toluene mixture coming from evaporator 26 in line 29. The combined mixture is sent via line 29 to fractionator 36 wherein a mixture of gaseous hydrocarbon and sulfur dioxide is taken off as a top fraction, and sent via line 37 through heat exchanger 38 to accumulator 39. The normally gaseous hydrocarbon, present as a liquid, may be withdrawn via line 40 and sent to line 41 and heat exchanger 42 for vaporization, and recycled via line 43 to the bottom of stripper 31. The sulfur dioxide in accumulator 39 is withdrawn by line 44, and a part or all thereof may be recycled to the fractionator 36 as reflux by line 45. A portion of the sulfur dioxide may be sent via line 46 back to surge-tank 15. A toluene-rich fraction is withdrawn from the bottom of fractionator 36 by line 47, and passes through junction 48 into line 49 whereby it is sent back to line 21 and reactor 4.

A portion of the toluene-rich fraction is removed at line 50 and sent through reboiler 51, and the vapors are returned to the fractionator by line 52. Also, a portion of gaseous hydrocarbon may be by-passed from line 40 to join the toluene-rich portion in line 50 passing into reboiler 51. Lines 47 and 53 are used to convey sulfur-dioxide-free reaction products when fractionator 36 is used alone to remove the sulfur dioxide described in connection with Example II.

A toluene solution of petroleum sulfonic acids is withdrawn from stripper 31 via line 54, and sent through junction 55 into heat exchanger 56. At junction 55, the sulfonated products mix with hydrated base (to be described) and the mixture of toluene, sulfonic acids, and alkali metal or alkaline earth metal base is raised to a sufficient temperature, that is, about 300° to 400° F., to promote the neutralization within heat exchanger 56. Products from heat exchanger 56 pass through control valve 57 and a second heat exchanger 58 under the influence of a second control valve 59. Valves 57 and 59 are automatic pressure-control valves which serve to maintain the stream at such pressure that water will be prevented from evaporating in the first exchanger 56, and toluene will be substantially evaporated in the second exchanger 58. A reaction temperature of about 300 to 400° F., preferably 350° F., is maintained in both exchangers. The reaction temperature is controlled by the combination of heat exchangers 56 and 58, and the evaporation of water and toluene is controlled by valves 57 and 59. The reaction products then pass through line 60, valve 61, and line 62 to toluene evaporator 63 with a large portion of toluene already in the vapor phase. Evaporators 26 and 63 are of similar construction.

The invention relates to both the preparation of petroleum sulfonic acids per se and metal salts of petroleum sulfonic acids. To prepare the former it is only necessary to vacuum distill or strip with butane, etc., the reaction mixture in evaporator 63 to remove solvents. To prepare the latter, steam is injected into the evaporator by line 64. Evaporator 63 is equipped with jacket 65 for the purpose of maintaining the sulfonic acids or petroleum sulfonates at optimum temperatures by supplying enough heat to replace the heat of evaporation of toluene removed overhead as a vapor. Steam and toluene vapors are drawn off in line 66 and pass through cooler 67 wherein water and toluene are condensed. Vacuum ejector 68 operated by steam entering line 69 maintains a suitable subatmospheric pressure in evaporator 63 of about 100 to 500 mm. Hg. The substantially pure toluene produced is drawn off through line 70 to tank 71, and recycled back into the system by line 72.

A substantial proportion of water will collect in tank 71 as a result of the steam distillation. The major part of this water is water of reaction and one embodiment of the invention comprises the utilization and recycle of this water in the preparation of alkali metal or alkaline-earth metal hydroxide is employed so that no outside water stream need be continuously treated for process use, as will be subsequently described. This water is withdrawn from tank 71 by line 73 and sent to accumulator 74.

Stripped, toluene-free petroleum sulfonates issue as bottoms from evaporator 63 through line 75, and pass through heat exchanger 76 and branch lines 77 and 78 to tanks 79 and 80, from which they may be withdrawn as desired, passing through lines 81 and 82 and filter 83 for use. Tanks 79 and 80 are fitted with steam coils 84 and 85 for the purpose of maintaining the product at a pumpable temperature in the event that a product which is viscous at ordinary temperatures is produced. Finished product is withdrawn at line 86. A portion of the petroleum sulfonates may be recycled for further treatment with metal oxide or hydroxide by passage through lines 81 and 82, branch line 87, slop tank 88 fitted with steam coil 89, line 90, pump 91, and valve 92 back to junction 55. However, this recycle operation is only necessary if the products after neutralization are not sufficiently basic for the intended purpose.

Alkali-metal or alkaline-earth-metal base used to prepare metal salts of the petroleum sulfonic acids is conveyed from storage bin 100 by conveyor 101 to hopper 102 and enters melting tank 103. This mixing and melting zone is used to mix the base with a sufficient amount of water to convert same to the hydrate or hydroxide form found to be preferable in the preparation of sulfonate salts. Agitation is provided by mixer 104 and heating or cooling, when necessary, by coil 105. The finished, hydrated-base melt leaves the mixer tank 103 via line 106, propelled by pump 107, and enters filters 108 and 109 through appropriate branch lines. The refined base minus any insoluble carbonates leaves the filters as a fluid mass by branch lines 110 and 111, and line 112, and goes to tank 113 wherein it is maintained at a temperature of about 150° F. to 300° F. by means of steam coil 114. The melt of the metal base is conveyed by pump 115 through line 116 which joins with junction 55 and line 54 conveying recycled material.

Water from tank 74, previously described, may be heated by steam coil 117, conveyed by lines 118 and 119 into branch lines 120 and 121 (controlled by valves 122 and 123), and passed into the top portion of filters 108 or 109. The water is passed through filters 108 and 109 to recover soluble alkali-metal or alkaline-earth-metal bases by washing the filter cake before it is discharged. The resulting wash-water from this operation, as well as additional water from tank 74, is conveyed by lines 124 and 125 into line 126 and thence to melter tank 103 by line 127. The water can by-pass the filters 108 and 109 by going directly from line 119, through line 128, to line 127. Excess water may be withdrawn by line 129 to sewer. By-pass line 200 around evaporator 26, and the function of toluene-stripper 204 will be described in connection with Example II.

Referring to the drawing as just described, the operation of the process is as follows and illustrates a first embodiment of the invention.

*Example I*

A 200 vis. neutral oil was continuously mixed with approximately 60 pounds of sulfur trioxide per 100 gallons of feed and about one volume of sulfur dioxide per volume of oil feed in reactor 4 operating at about 100° F. and under a pressure of about 30 p. s. i. g., i. e., sufficient to maintain the sulfur dioxide in a liquid phase. Xylene was introduced into reactor 4 by line 21. Reactor 4 is designed (baffles not shown) to prevent xylene from ascending above the bottom section. This served the purpose of minimizing the precipitation of sludge from the sulfonic acids into the sulfur dioxide mixture, and from the sulfonic acids phase after sulfur dioxide has been evaporated for recycling. A further function was to reduce foaming in the sulfonic acids phase as sulfur dioxide was evaporated by evaporator 26. The presence of the toluene or xylenes also reduced foaming after neutralization when the water of neutralization was evaporated in evaporator 63.

The effluent reaction products from reactor 4 were heated by heat exchanger 24, to a temperature of between 175° to 180° F. and entered sulfur dioxide evaporator 26 at a pressure greater than that maintained in the sulfur dioxide surge tank 15. The sulfur dioxide was removed in evaporator 26 at a pressure of 20 p. s. i. g. The remainder of the sulfur dioxide was removed in vacuum flash vessel or stripper 31 by means of stripping under reduced pressure with butane entering through line 40, 41, and 43. Vaporizer 42 included in line 43 vaporizes the gaseous hydrocarbon prior to entry into stripper 31. The amount of butane circulated was about 0.02 gallon of liquid butane per gallon of oil feed, at the operating pressures and temperatures imposed. A reduced pressure was maintained within stripper 31. A mixture of sulfur dioxide, gaseous hydrocarbon, and small amounts of toluene passed through line 32, heat exchanger 33 and compressor 34, joining the sulfur dioxide-toluene vapor stream from evaporator 26 in line 29. The composite mixture entered fractionator 36 wherein sulfur dioxide and butane were taken overhead in line 37, and the toluene emerging as a residue from the bottom in line 47 was recycled via line 49 to line 21.

The mixture of sulfur dioxide and any butane present in the overhead from fractionator 36 was passed through line 37 into cooler 38 where it was condensed to form two liquid layers in accumulator 39. The sulfur dioxide layer therefrom, containing some butane in solution, if used, was recycled via lines 44 and 45, or via line 46, to surge-tank 15. Because of the greater reactivity of the oil with sulfur trioxide in comparison to that of butane, and because reactor 4 was sized to provide a contact time of only about one minute or less, there was no appreciable sulfonation of butane, and the butane in the sulfur dioxide layer was continuously recycled through reactor 4, evaporator 26 and vacuum stripper 31 to fractionator 36. The butane liquid layer from accumulator 39 was recycled to the bottom of vacuum stripper 31 by lines 40, 41, and 43.

In melter 103, about 10 parts barium oxide were mixed with about 10 parts of water, i. e., just enough water to form barium hydroxide octahydrate, Ba(OH)₂.8H₂O (which melts at about 172° F.), and the molten material was pumped through filters 108 and 109 to remove insoluble impurities such as barium carbonate. The purified barium hydroxide stream was mixed with the sulfonic acids—xylene or toluene—stream coming from stripper 31, and the mixed stream was heated to 350° F. within the pressurized heat exchanger 56. In this temperature range the barium hydroxide and sulfonic acids reacted rapidly, and part of the heat requirement was supplied by the heat of reaction. The barium sulfonates were passed through pressure reduction stages controlled by valves 57 and 59, and were reheated in exchanger 58 to maintain the temperature of about 350° F. Heat exchanger 58 supplied the major part of the heat required for evaporation of the xylene or toluene because the limited heat input possible from the steam jacket 65 on toluene evaporator 63 was insufficient, in conjunction with stripping with superheated steam within evaporator 63 from line 64, to evaporate substantially all the remaining toluene or xylene.

The vapors issuing from evaporator 63 were condensed in cooler 67 to form a water and a toluene layer in accumulator 71. The liquid toluene phase was recycled via line 72 to line 17 and thence through drier 18 to toluene surge-tank 20. The liquid water phase was returned to the barium hydroxide melter 103 by lines 73, 119, and 128. The residue, or product, issuing from toluene evaporator 63 by line 75 was cooled in heat exchanger 76, maintained at a pumpable temperature in rundown tanks 79 or 80 by heating coils 84 or 85, and passed via lines 81 and 82 through filter 83 to use or storage. In order to protect the reactor system, water was removed from both the oil feed and the toluene. This was accomplished by driers 2 in oil line 1 and drier 18 in toluene line 17.

In another embodiment of the invention it is possible to eliminate foaming within the system by employing a sufficiently large amount of toluene or xylene. In this embodiment, the modification of the process which can be utilized is illustrated by the following example.

*Example II*

In this second embodiment of the invention, evaporator 26, stripper 31, cooler 33, and compressor 34 were eliminated and sulfur dioxide was stripped from the sulfur dioxide-sulfonic acids-toluene mixture by means of butane in sulfur dioxide fractionator 36, the butane entering into lines 40, and 52, and being vaporized in heat exchanger 51. For this purpose, products leaving reactor 4 in line 23 were conducted so as to by-pass evaporator 26 by line 200 (controlled by valve 201), and entered sulfur dioxide fractionator 36 by line 29. Valves 25 and 35 in lines 23 and 32 were closed, and the sulfur-dioxide-and-butane overhead was passed through line 37 and condenser 38 into accumulator 39 as before. The sulfur dioxide separated in accumulator 39 was passed through line 44, and may be thereby refluxed through line 45. In one operation, the sulfur dioxide was passed back to the sulfur dioxide surge-tank 15 by line 46. The butane phase from accumulator 39 passes through line 40 into heat exchanger 51, and thence through line 52 back into sulfur dioxide fractionator 36.

A mixture of toluene and sulfonated products was passed from sulfur dioxide fractionator 36 by line 47 and valve-controlled line 53 to junction 55, where base was added, into heat exchangers 56 and 58, and thence through line 202, controlled by valve 203, into the top of toluene-stripper 204. Valve 61 in line 62 was closed, a toluene-rich fraction was removed from the top of stripper 204 through line 205 and passed through cooler 66 into accumulator 71, and was returned by line 72 back to drier 18. Steam for the operation of the toluene-stripper entered at line 206.

The stream of toluene-stripped products passing from stripper 204 into line 207 was divided into a reflux stream passing through line 208 into reboiler 209, and a product stream passing via line 210 into drier 211. Water vapor was removed as a top fraction through line 212, and was ejected from the system by vacuum-ejector 213 which was steam operated. Water-free products were passed from evaporator 211 by line 214, controlled by valve 215, into line 75. From line 75 the products passed through heat exchanger 76 into tanks 79 or 80 and filter 83, as previously described. Any butane that remained dissolved in the tower bottoms remained unchanged, and was circulated together with the toluene.

The oil-soluble metal petroleum sulfonates produced in accordance with this invention showed good detergent properties when compounded in lubricating oils and tested by both the drip detergency test and COT engine test. In general, any sulfonatable petroleum hydrocarbon stock may be treated in accordance with the invention including both naphthenic and paraffinic base oils. The invention is most applicable to those sulfonatable materials which are not appreciably soluble in sulfur dioxide, that is, non-polar organic compounds exemplified by the 200 vis. (100° F.) neutral oil of 85 VI used in the examples herein, which oil was solvent-refined and of paraffinic nature. Other non-polar organic materials would include paraffinic hydrocarbons of lower molecular weight than those found in lubricating oil fractions. Solvent extract fractions produced in the refining of lubricating oils, as bright stocks, may be used where the sulfonation process of the present invention is directed to the preparation of water-soluble sulfonic acids. The only limitations attaching to the invention appear in the appended claims.

What is claimed is:

1. The process for the production of petroleum sulfonic acids comprising introducing a water-free sulfonatable hydrocarbon oil and a mixture of sulfur dioxide and sulfur trioxide into a reaction zone maintained at about 14° to 150° F., allowing sufficient time in said reaction zone for the formation of petroleum sulfonic acids in both an oil phase and a sulfur dioxide phase therein, mixing the reaction products with a water-free mutual solvent for said phases while said products are still at reaction temperature, passing the solvent-reaction-product mixture to a heating zone maintained at about 140° to 220° F. wherein the major portion of said sulfur dioxide and a part of said mutual solvent are vaporized and removed, passing the products from said heating zone to a stripping zone in contact with vapors of a low molecular weight hydrocarbon to remove the balance of said sulfur dioxide, and separating sulfonic acids from the resulting products.

2. The process in accordance with claim 1 in which the mutual solvent is toluene.

3. The process in accordance with claim 1 in which the mutual solvent is mixed with the reaction mixture at the exit end of the reaction zone.

4. The process in accordance with claim 1 in which a major portion of sulfur dioxide and at least a portion of said mutual solvent from said heating zone along with a mixture of sulfur dioxide, some mutual solvent, and low molecular weight hydrocarbon from said stripping zone are combined and subjected to fractionation in a fractionation zone to remove as a vapor phase a mixture of sulfur dioxide and low molecular weight hydrocarbon, and as a liquid phase, a mutual-solvent-rich phase, condensing said vapor phase into a liquid sulfur dioxide phase and a low molecular weight hydrocarbon phase, recycling a portion of said sulfur dioxide phase back to said reaction zone, recycling a second portion of said sulfur dioxide phase back to said fractionating zone, recycling a portion of said low molecular weight hydrocarbon phase back to the fractionation zone and a second portion of said low molecular weight hydrocarbon phase back to said stripping zone.

5. The method in accordance with claim 4 in which the low molecular weight hydrocarbon is selected from the group consisting of butane and pentane.

6. The process in accordance with claim 1 in which the water-free sulfonatable hydrocarbon oil and the water-free mutual solvent are produced by separate contact of these materials with a dehydrating agent to remove any traces of water present.

7. The process in accordance with claim 6 in which the dehydrating agent is alumina.

8. The process in accordance with claim 6 in which the dehydrating agent is an adsorbent clay.

9. The process in accordance with claim 6 in which the dehydrating agent is rock salt.

10. The process in accordance with claim 1 in which the solvent solution of said sulfonic acids after removal of said sulfur dioxide is contacted with a hydrated melt of a metal base capable of reacting with said petroleum sulfonic acids to form the salt thereof in a neutralization zone, said hydrated melt containing only a sufficient amount of water to promote the neutralization, controlling the evaporation of water in said neutralization zone by maintaining superatmospheric pressures therein, separating the vapors of mutual solvent from the resulting salt of petroleum sulfonic acids in a stripping zone in the presence of steam to form a vapor phase comprising mutual solvent and water, separating said mutual solvent from said water, and employing at least a portion of said water as recycled water to form the hydrated metal base.

11. The process in accordance with claim 10 in which mutual solvent remaining from the separation from said water phase is recycled back to said reaction zone and mixed with said reaction products at a point near the exit of said reactor.

12. The process in accordance with claim 10 in which the hydrated melt of metal base is formed by heating a metal oxide in the presence of a stoichiometric amount of said recycled water to form the hydrated metal hydroxide.

13. The method in accordance with claim 12 in which the metal oxide is barium oxide.

14. The method in accordance with claim 10 in which the mutual solvent is toluene.

15. The method in accordance with claim 10 in which the mutual solvent is a xylene fraction boiling between about 275° to 310° F.

16. The method in accordance with claim 12 in which the melt of hydrated metal hydroxide formed by said heating step is filtered to remove insolubles and the filter coke is washed with at least a portion of said recycled water.

17. The method in accordance with claim 12 in which the metal base and recycled water are heated to a temperature of about 170° F.

18. The method in accordance with claim 10 in which said neutralization reaction zone is maintained at a temperature of about 300° F. to 400° F.

References Cited in the file of this patent

UNITED STATES PATENTS

| | | |
|---|---|---|
| 2,703,788 | Morrisroe | Mar. 8, 1955 |
| 2,706,736 | Birch et al. | Apr. 19, 1955 |
| 2,713,034 | Clarke et al. | July 12, 1955 |